Oct. 25, 1938.  W. J. BUEHRING  2,134,395
CABLE TERMINAL
Filed April 23, 1936   3 Sheets-Sheet 1

Oct. 25, 1938.   W. J. BUEHRING   2,134,395
CABLE TERMINAL
Filed April 23, 1936   3 Sheets-Sheet 2

Inventor:
William J. Buehring
By
Zabel Carlson & Wells
Attys

Oct. 25, 1938.    W. J. BUEHRING    2,134,395
CABLE TERMINAL
Filed April 23, 1936    3 Sheets-Sheet 3

Inventor:
William J. Buehring.
By
Zabel Carlson & Wells, Attys.

Patented Oct. 25, 1938

2,134,395

UNITED STATES PATENT OFFICE 2,134,395

CABLE TERMINAL

William J. Buehring, Chicago, Ill., assignor to Reliable Electric Co., Chicago, Ill., a corporation of Illinois Application April 23, 1936, Serial No. 75,987

2 Claims. (Cl. 247—7)

My invention relates to cable terminals and particularly to all metal protected cable terminals which are particularly designed to facilitate their mounting and connecting upon the pole and the maintenance thereof in good working condition for a long period of time.

It is one of the purposes of this invention to provide a cable terminal of this character which can be mounted very close to its support whether the same be a pole or a building without interfering with the space in which the lineman has to work. The novel structure makes it possible for the lineman to work in a more comfortable position and furthermore by placing the terminal closer to its support, reduces the amount of leverage and vibration upon the terminal and its lead cable.

The invention further contemplates a novel method of connecting the cable wires to the outlets from the cable chamber and the mounting of the fuse clips and discharge block springs whereby to keep them in position.

The invention further comprises a novel arrangement of the cable chamber fuses, fuse mountings and binding post racks accumulating to provide a maximum air circulation within a cover for the mechanism.

The invention further contemplates the provision of an improved cover structure for the cable terminals.

Furthermore, the invention includes a novel structure whereby the jumper wires are no longer passed through fanning holes at the sides of the terminal but are brought up at the front of the terminal so as to be received directly by binding posts also at the front of the terminal.

Other objects and advantages will appear more clearly as the description proceeds reference being had to the acompanying drawings wherein the preferred form of the invention is shown. It is to be understood, however, that the drawings and description are illustrative only and are not to be taken as limiting the invention except in so far as it is limited by the claims.

In the drawings—

Fig. 6 is an enlarged fragmentary section showing the manner of connecting the top part of the cover in place.

Figure 1:
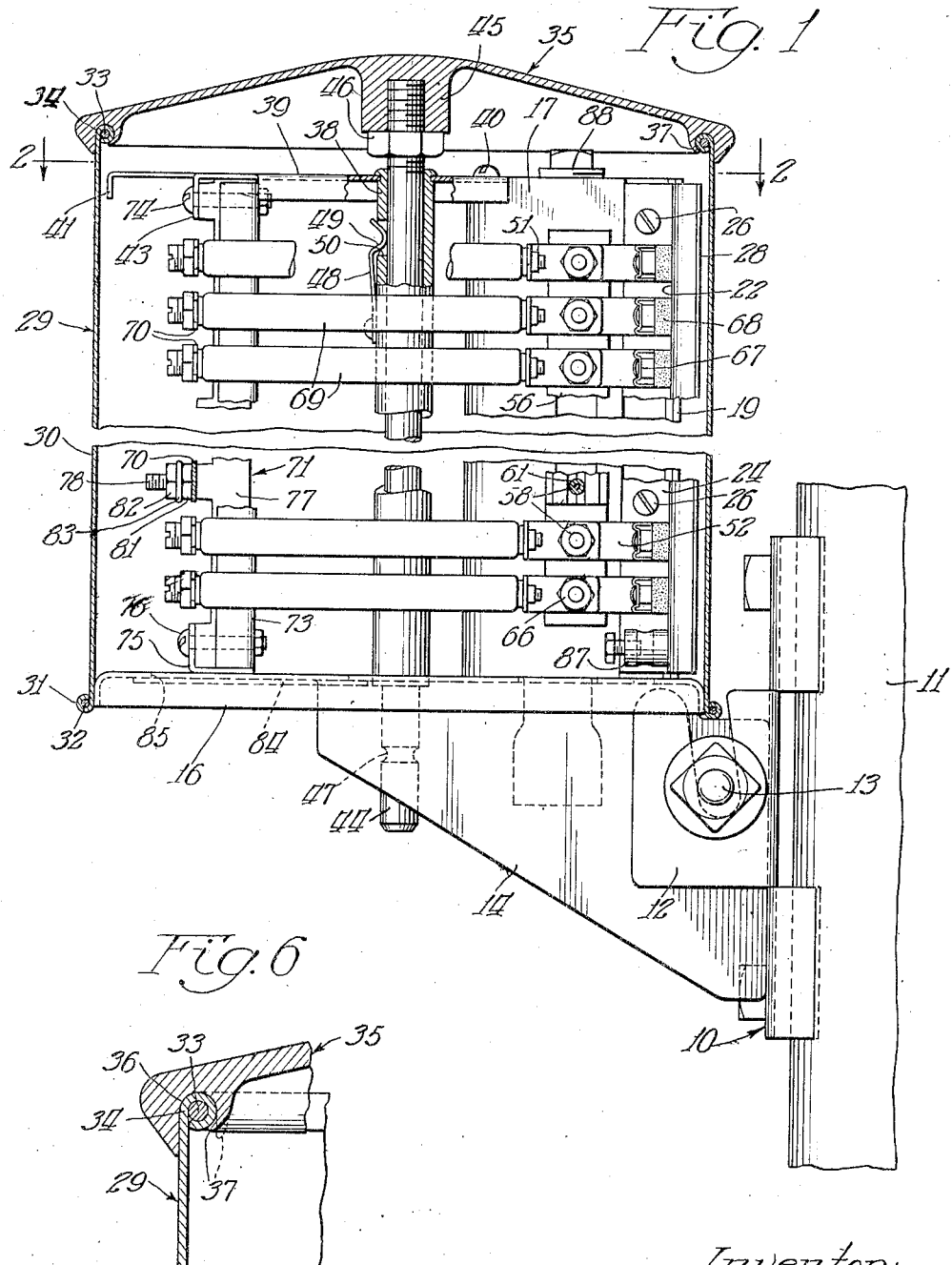
Fig. 1 is a side view partly in section of a cable terminal embodying the invention.

Referring now in detail to the drawings, this terminal is shown as adapted to be mounted on a pole bracket 10 which is bolted to a pole 11 without gaining. The bracket has a hook shaped projection 12 at each side thereof which is adapted to receive a bolt 13 connecting a pair of depending mounting brackets 14 and 15 on a base plate 16 of the terminal. The brackets 14 and 15 may be secured in any suitable manner as by welding to the base plate 16. This base plate 16 carries a one piece casting 17 which forms a cable chamber for receiving a cable 18.

The casting 17 is closed at its back by means of a cover plate 19 held in place by suitable screws 20. As shown, the cover plate 19 is made up of an outer metal sheet and an inner insulating sheet. At the back side, the casting 17 has bolted thereto at the opposite side edges of the plate 19 a pair of ground strips 21 and 22 which run vertically substantially the length of the casting.

These ground strips are made of heavy brass and have mounting portions 23 and 24, respectively, bent at right angles to the main body portions thereof. The mounting portions 23 and 24 are held in place by suitable screws 25 and 26. At their outer edges, the ground strips 21 and 22 are bent rearwardly toward the post 11 as shown at 27 and 28 in order that they may serve as guides for a cover 29.

The cover 29 has a tubular portion 30 which is sheet metal and is beaded at its bottom end at 31 around a wire 32 to give it rigidity and to provide a smooth edge. Similarly, the tubular portion 30 is beaded at its upper end around a wire 33 as indicated at 34. The top of the cover is the part which gets the roughest service after the terminal is up and is usually the part which rusts or corrodes away first. In the present device, a top 35 is made of cast metal so as to have a greater rigidity and a greater resistance to attack by the elements. In order to fix the top 35 to the tubular portion 30 of the cover, the top is provided initially with a groove 36 that runs around its periphery and that is opened to receive the beaded end 34 of the tubular portion 30. Then a lip 37 on the casting is curled against the beaded end 34 so as to lock the top casting firmly in place. This makes a very sturdy and reliable terminal cover which can stand the weight of the lineman without bending. The cover is very light however because of the fact that only that part which receives the roughest wear is cast and it is of a light metal.

Figure 3:
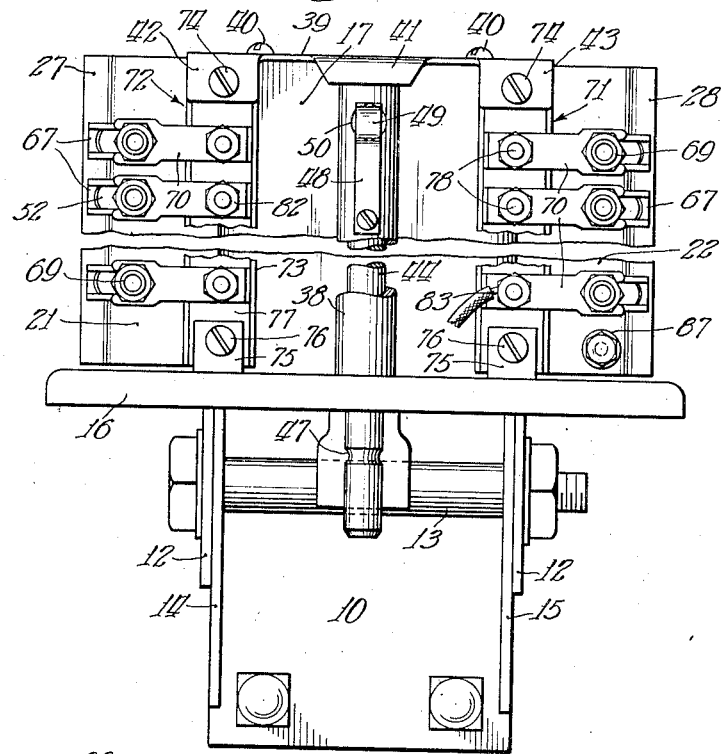
Fig. 3 is a front view of the device with the cover removed, an intermediate portion of the device being broken away to avoid duplication of parts.
Figure 4:
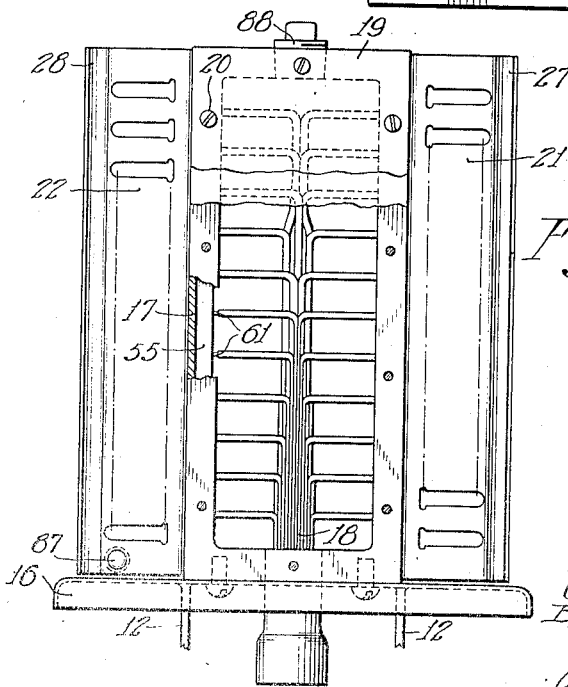
Fig. 4 is a rear view of the terminal with the cover removed.

As hereinbefore stated, the ground strips 21 and 22 act as guides at the back for the cover 29. An additional guide is provided for the cover in the form of a sleeve 38 which is connected at its bottom to the base plate 16 and its top to a top plate 39. The top plate 39 is secured to the casting 17 by means of screws such as 40. This top plate runs forward substantially to the front wall cover 29 where it is provided with a down turned projection 41 as shown most clearly in Fig. 3. The top plate 39 does not have the projection 41 extending all the way across the front. It does however have a pair of down turned flanges 42 and 43 which support binding post racks that will be more fully described hereinafter.

The sleeve 38 forms a guide for a rod 44 which is screwthreaded into a boss 45 provided on the undersurface of the top casting 35. A nut 46 locks the rod 44 in place. This rod has an annular groove 47 adjacent its free end which groove is adapted to cooperate with a spring finger 48 that is fixed to the sleeve 38. The spring 48 has a portion 49 which projects through an opening 50 in the sleeve 38 so as to bear against the rod 44 and frictionally oppose movement of the cover 29 vertically with respect to the terminal structure. When the cover 29 is lifted high enough to cause the spring portion 49 to drop into the groove 47, this locks the cover in raised position so that the lineman may work on the terminal without detaching the cover. The frictional engagement of the spring portion 49 the rod 44 is sufficient to hold the cover normally in any desired position but of course when the lineman is working on the terminal, he usually prefers to have the cover raised well out of the way.

Figure 2:
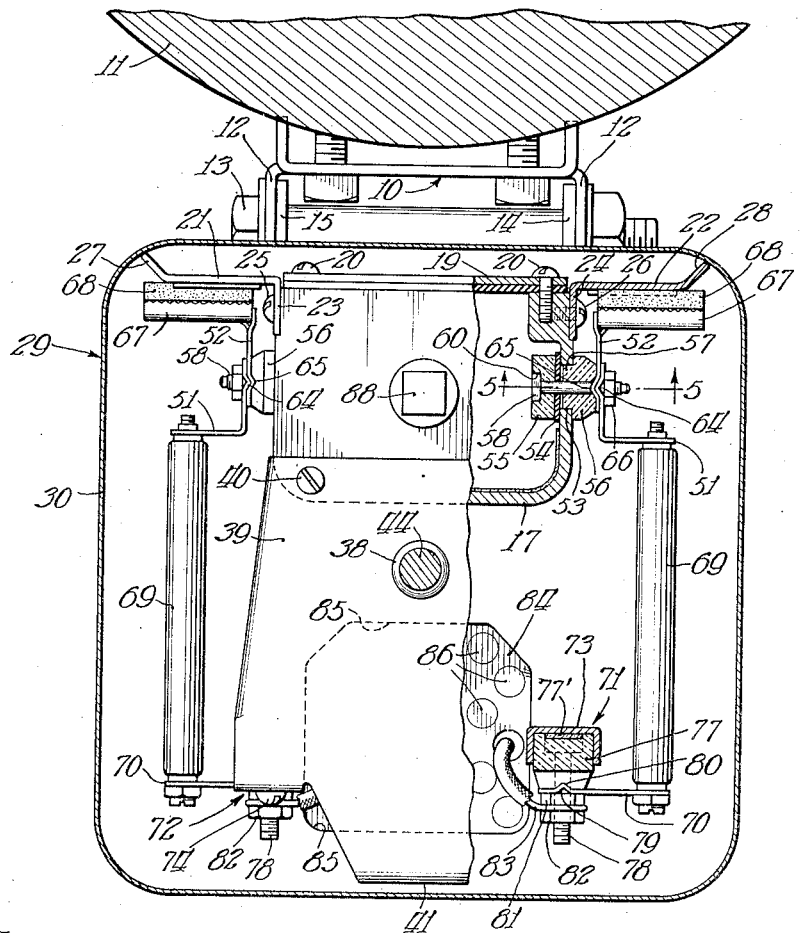
Fig. 2 is a plan sectional view taken substantially on the line 2—2 of Fig. 1 with certain parts broken away for the sake of clearness.
Figure 5:
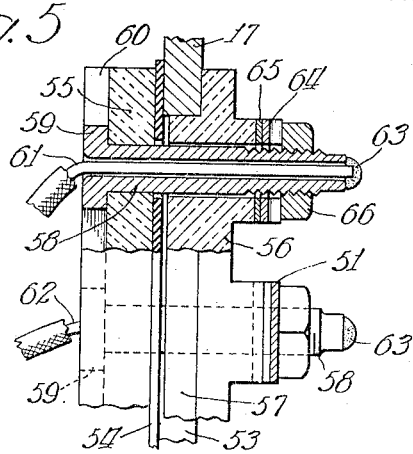
Fig. 5 is an enlarged sectional view on the line 5—5 of Fig. 2.

Referring now more particularly to Figs. 1, 2 and 5, the various wires of the cable 18 are fanned out and brought through opposite walls of the casting 17 for connection to fuse clips 51 and discharge block springs 52. The manner of passing the conductors through the wall of the casting 17 is of considerable importance and will be described in detail hereinafter.

The structure on opposite sides of the casting 17 is substantially the same so a description of one side will suffice for both.

The casting is provided with an elongated vertical slot 53 and on the inside of this slot there is a sealing strip or gasket 54 over which is placed an elongated strip of insulating material 55 which may be of any suitable insulating material such for example as the synthetic resin compound commonly used as an electric insulator. On the exterior of the casting 17, there is provided a second strip 56 of the same insulating material and this strip has a reduced portion 57 which fits in the slot 53 so as to form with the gasket 54 a good seal for the opening in the casting 17.

The strips 55 and 56 as well as the gasket 54 are provided with apertures to receive a plurality of metallic sleeves 58 which sleeves are provided with flanges 59 that seat in a groove 60 (see Fig. 5) running vertically in the strip 55. The sleeves 58 receive the bare wires such as 61 and 62 which are fanned out from the cable 18 and these wires pass through the sleeves 58 being soldered thereto on the outside as indicated at 63 (see Fig. 5).

The aperture in the gasket 54 and in the strip 56 for the sleeve 58 is slightly larger than the sleeve 58 so as to present no difficulty in aligning the apertures with the sleeve. Also, the projecting portion 57 of the strip 56 is slightly less in thickness than the thickness of the wall of the casting 17 so that there is no direct pressure transmitted from the outer strip 56 to the inner strip 55 when the two strips are clamped on the casting 17.

The fuse clip 51 and the spring 52 are bent to provide V-shaped portions at 64 and 65 and the strip 56 is provided with a V-shaped trough or groove running lengthwise thereof to seat these portions. Nuts 66 clamp the fuse clips 51, the springs 52 and the strips 55 and 56 in place. Any desired number of fuse clips and springs may be provided on the opposite sides of the casting 17 as will be readily understood. The V-shaped portions 64 and 65 and the corresponding seat provided in the strip 56 serve to align the springs and fuse clips and keep them in position.

Each discharge block spring 52 has associated therewith one member 67 of a discharge block, the other member 68 thereof being fixed to the corresponding ground strip 21 or 22. The fuse clips 51 serve to support one end of the fuses 69. The other end of the fuses 69 are supported by means of fuse clips 70 which are in turn carried by a pair of binding post racks 71 and 72.

Each binding post rack comprises a channel strip 73 secured at its upper end to one of the flanges 42 or 43 by screw bolts 74. The channel strip 73 is secured at its lower end to the base plate 16 by means of a bracket 75 and a screw bolt 76. A strip 77 of insulating material such as the material from which the strips 55 and 56 are made is seated in the channel 73 and secured in position therein by means of the screw bolts 74 and 76.

The strips 77 are recessed at the back to receive the heads of binding posts 78. A cover strip 77' is provided to prevent the heads of the binding posts contacting the channel strips 73. The fuse clips 70 are crimped to provide V-shaped portions 79 (see Fig. 2) that seat in corresponding grooves 80 in the strips 77 to position and align the fuse clips. Nuts 81 are used to clamp the fuse clips 70 against the strips 77, and nuts 82 are then employed for connecting jumper wires such as 83 to the binding posts 78.

The jumper wires 83 enter the terminal through the base plate 16. This base plate has a sheet 84 covering an opening 85 therein, the sheet 84 being constructed of any suitable material. This sheet 84 is provided with a plurality of individual knock-out holes 86 that are utilized for the various jumper wires as needed. Thus the terminal is practically sealed by the cover 29 with the exception of the small space around each jumper wire where it comes through the knock-out holes 86 in the sheet 84. This does not permit dirt or moisture to enter the terminal enclosure to an appreciable extent and is of considerable importance in keeping the terminal in good working order because insects, moisture and dirt cannot get inside.

The ground strips 21 and 22 are preferably connected by a copper strip not shown and the ground strip 22 is provided with a terminal at 87 for connection to a ground wire.

This terminal is designed as hereinbefore described to bring the most essential parts thereof into the most accessible position. For instance, while it has heretofore been the practice for the lineman to bring the jumper wires between the terminal and the pole and feed them through fanning holes, the present structure permits the jumper wires to be brought up at the front of the terminal without fanning holes. The binding posts are at the front where it is easy to attach the jumper wires to them. The fuse clips are arranged at the sides where the fuses are readily accessible when the cover is raised.

The cable chamber is a one piece casting in which the cable is easily installed. The wires of the cable are fanned out and the individual conductors are soldered outside the casting to hollow studs or sleeves which enter the casting through the insulating strips 55 and 56. The casting 17 may, of course, be filled with the usual insulating compound through a filler opening at the top which is closed by a plug 88.

The cable chamber, fuses, fuse mountings and binding post racks as arranged, make a skeleton structure which permits the air to circulate freely inside the cover thus keeping moisture accumulation to a minimum.

From the above description, it is believed that the construction and advantages of this device will be readily apparent to those skilled in this art.

Having thus described one specific form of the invention what I claim as new and desire to secure by Letters Patent is:

1. In a cable terminal of the class described having a rectangular base plate and a cable chamber supported on said base plate adjacent to one side edge thereof, ground strips secured on said cable chamber and projecting outwardly from the chamber in opposite directions substantially to the adjacent corners of said base plate, a guide sleeve supported by said base plate and a cover for said terminal having a guide rod slidable vertically in said sleeve, said ground strip having vertically running edges cooperating with said sleeve and guide rod to guide the cover.

2. In a protected cable terminal having a rectangular supporting base, a cable sealing chamber on said base adjacent one side edge thereof, mounting means for said cable terminal at said side edge for mounting the terminal upon a pole, and a cover for said terminal, guide means for guiding said cover into position on said terminal comprising ground strips secured on said cable chamber and projecting outwardly from the cable chamber in opposite directions, a cover guide on the terminal on the opposite side of the chamber from the mounting means, said ground strips having vertically running edges cooperating with said cover guide to direct the cover, binding post racks on said base spaced from the chamber and adjacent to the side edge of said base most remote from the mounting means, and means at the top of the terminal rigidly connecting the top of the cable chamber with the top ends of said racks.

WILLIAM J. BUEHRING.